US012593357B2

(12) United States Patent
Wilhelmsson et al.

(10) Patent No.: US 12,593,357 B2
(45) Date of Patent: Mar. 31, 2026

(54) TRANSMITTING A SIGNAL

(71) Applicant: Telefonaktiebolaget LM Ericsson (publ), Stockholm (SE)

(72) Inventors: Leif Wilhelmsson, Lund (SE); Narendar Madhavan, Bara (SE); Christian Bergljung, Lund (SE); David Sugirtharaj, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 18/562,073

(22) PCT Filed: May 20, 2022

(86) PCT No.: PCT/EP2022/063737
§ 371 (c)(1),
(2) Date: Nov. 17, 2023

(87) PCT Pub. No.: WO2022/243520
PCT Pub. Date: Nov. 24, 2022

(65) Prior Publication Data
US 2024/0251441 A1 Jul. 25, 2024

Related U.S. Application Data

(60) Provisional application No. 63/191,071, filed on May 20, 2021.

(51) Int. Cl.
*H04W 74/0808* (2024.01)
(52) U.S. Cl.
CPC ................................ *H04W 74/0808* (2013.01)

(58) Field of Classification Search
None
See application file for complete search history.

(56) References Cited

U.S. PATENT DOCUMENTS

| 2009/0146791 A1* | 6/2009 | Jantunen | ................... | H04B 5/26 |
| | | | | 340/10.2 |
| 2016/0380791 A1 | 12/2016 | Vishwanathan | | |

(Continued)

FOREIGN PATENT DOCUMENTS

| WO | 2021161483 A1 | 8/2021 |
| WO | 2022029365 A1 | 2/2022 |

OTHER PUBLICATIONS

3GPP , "Electromagnetic compatibility and Radio spectrum Matters (ERM); Wideband transmission systems; Data transmission equipment operating in the 2,4 GHz ISM band and using wide band modulation techniques; Harmonized EN covering essential requirements under arti", Draft ETSI EN 300 328 V1.8.1, Sep. 2008, 1-49.

(Continued)

*Primary Examiner* — Clemence S Han
(74) *Attorney, Agent, or Firm* — Murphy, Bilak & Homiller, PPLC

(57) ABSTRACT

Examples of this disclosure include a method of transmitting a first signal in a first frequency range. The method comprises detecting a second signal in a second frequency range within the first frequency range, wherein the second frequency range is smaller than the first frequency range, and determining a first threshold based on a bandwidth of the second signal. If a signal power of signals within the first frequency range is below or equal to the first threshold, transmitting the first signal within the first frequency range.

20 Claims, 7 Drawing Sheets

(56) References Cited

U.S. PATENT DOCUMENTS

| | | | | |
|---|---|---|---|---|
| 2017/0318607 | A1* | 11/2017 | Tiirola | H04W 4/10 |
| 2018/0115909 | A1 | 4/2018 | Yankevich et al. | |
| 2021/0307065 | A1 | 9/2021 | Xue et al. | |
| 2021/0385859 | A1* | 12/2021 | Liu | H04W 74/002 |
| 2022/0053562 | A1* | 2/2022 | Chande | H04W 74/0808 |
| 2022/0053563 | A1* | 2/2022 | Chande | H04B 17/336 |

OTHER PUBLICATIONS

Bamahdi, Omer A., et al., "An Adaptive Frequency Hopping Technique with Application to Bluetooth-WLAN Coexistence", Proceedings of the International Conference on Networking, International Conference on Systems and International Conference on Mobile Communications and Learning Technologies, Apr. 23, 2006, 1-5.

* cited by examiner

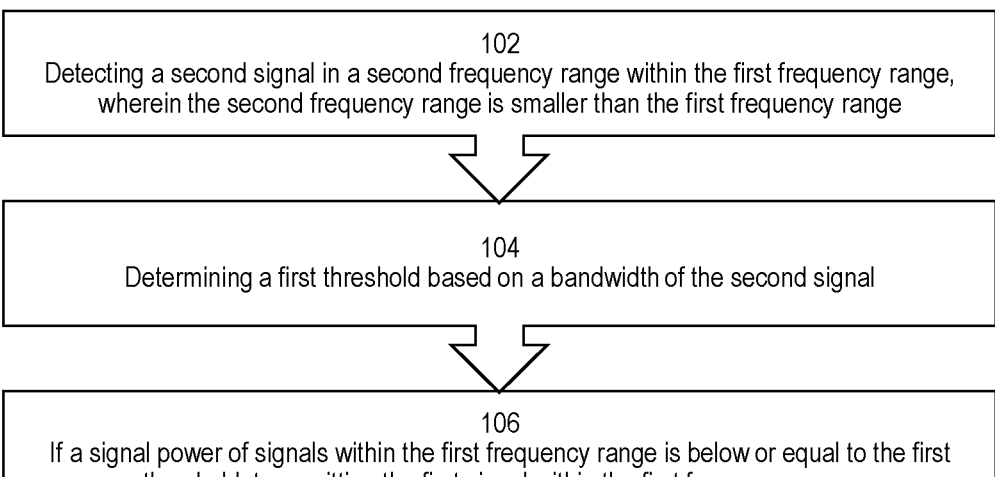

102
Detecting a second signal in a second frequency range within the first frequency range, wherein the second frequency range is smaller than the first frequency range 104
Determining a first threshold based on a bandwidth of the second signal 106
If a signal power of signals within the first frequency range is below or equal to the first threshold, transmitting the first signal within the first frequency range

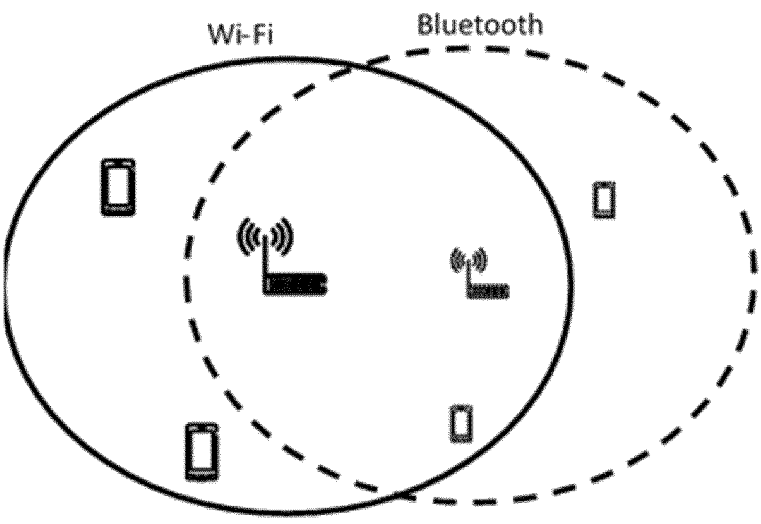

Wi-Fi     Bluetooth

FIG. 2

Interface — 606

600

Processing circuitry — 602

Memory — 604

TRANSMITTING A SIGNAL

TECHNICAL FIELD

Embodiments of this disclosure relate to transmitting a signal, for example transmitting a first signal in a first frequency range in the presence of a second signal in a second, smaller frequency range.

BACKGROUND

In wireless communications, when operating in unlicensed bands, e.g. the 2.4 GHz ISM band and the 5 GHz band, some means of spectrum sharing mechanism is typically required unless the transmissions are limited to use a very low power. The two most commonly used spectrum sharing mechanisms for unlicensed bands are listen before talk (LBT), also referred to as carrier sense multiple access with collision avoidance (CSMA/CA), and frequency hopping (FH). Medium utilization (MU) is also used as a spectrum sharing mechanism in unlicensed bands. Typically, wideband devices which support high data rates utilize LBT while NB (narrowband) devices supporting low data rate utilize FH and/or MU.

The working procedure of LBT is as the name suggests. Before a transmission can be initiated, the transmitter listens on the channel to determine whether it is idle of if there is already another transmission ongoing. If the channel is found to be idle, the transmission can be initiated, whereas if the channel is found to be busy, the transmitter must defer from transmission and may essentially keep sensing the channel until it becomes idle. LBT is used by different flavors of IEEE 802.11, commonly referred to as Wi-Fi, operating in e.g. the 2.4 GHz ISM band as well as in the 5 GHz bands. LBT is also employed by standards developed by 3GPP operating in the 5 GHz band, e.g. NR. If instead FH is used, the spectrum sharing is based on only using a specific part of the band for a relatively small fraction of the total time, leaving room for other transmissions. FH is the approach used by Bluetooth.

Typically LBT is the preferred approach if the used channel bandwidth it relatively large, say 20 MHz or more. FH, on the other hand, is well suited for narrowband systems where the bandwidth is on the order of 1 or 2 MHz.

Although both LBT and FH can be viewed as effective spectrum sharing mechanisms, both typically only work well if all devices are using the same spectrum sharing mechanism. That is, if all devices apply LBT or if all devices use FH things work well. However, if some devices use LBT whereas others use FH, problems may arise. As one example, a wideband system using LBT may detect the narrowband transmission and defer from transmitting although such a transmission would have been successful without causing any noticeable harm (e.g. excessive interference) to the narrowband system. Conversely, the wideband system may not detect a narrowband system, since the average sensed power of a narrowband signal within the wideband channel may be relatively low, and then initiate a transmission that potentially can result in harmful interference to the narrowband system. It is believed that the former is more of an issue.

Today, the above situation is present in the 2.4 GHZ ISM band, where Wi-Fi uses LBT, whereas Bluetooth uses FH. To allow for good coexistence between the two standards, Bluetooth has developed support for adaptive FH (AFH), which means that the Bluetooth devices detect if there are Wi-Fi transmissions on some of the Wi-Fi channels, and then adapt the frequency hopping pattern used for FH such that the frequencies coinciding with a Wi-Fi channel are not used. In Bluetooth Low Energy (BLE), additional specific measures are taken to limit the interference to Wi-Fi, by only using three channels for the initial link establishment, and where these three channels are selected such that they will not overlap with the three most commonly used Wi-Fi channels (Channels 1, 6 and 11).

AFH is a rather effective coexistence mechanism, but it has two limitations. The first is that it by necessity takes some time to determine whether a frequency channel should be considered as occupied by e.g. Wi-Fi and therefore should not be used, and also to determine when it is no longer occupied so that it should be used. How long this takes may also depend on how much the channel is used, and it can be expected that if a Wi-Fi channel is only used, say, 10% of the time many Bluetooth transmissions may be needed in order to determine that in fact the channel is used by Wi-Fi. The second problem is that AFH only makes sense as long as it is possible to find some channels that are free from interference. If for instance Wi-Fi would use an 80 MHz channel in the ISM band (which is currently not permitted), it is clear that AFH would not work since there are no channels remaining.

The second problem, i.e., that the wideband system uses a channel that covers the entire bandwidth of the system using FH may, however, be a problem if Bluetooth or other frequency hopping communication mechanism is employed in e.g. the 6 GHz band still using a total bandwidth of around 80 MHz, just like in the 2.4 GHz band. In the 6 GHz band, Wi-Fi may use 80 MHz, 160 MHz, or even more in the future. This means that AFH simply will not work as intended and also, due to this, that Wi-Fi may detect every Bluetooth transmission and defer from transmitting due to the LBT procedure.

The problem is described above for the situation of a single Bluetooth link. Since Bluetooth is designed to support a large number of simultaneous links with only graceful degradation, the problem may be significantly worse for Wi-Fi in situations where several Bluetooth transmissions occur in parallel, unless Wi-Fi is able to change to another channel.

There currently exist certain challenge(s). For example, the fundamental problem is caused by the use of two fundamentally different spectrum sharing strategies (e.g. LBT for Wi-Fi and frequency hopping technology for Bluetooth), each designed assuming that all devices adhere to it. When this condition is not fulfilled, at least one and potentially both spectrum sharing strategies may not work properly. In particular, the spectrum sharing strategy based on LBT may be particularly impacted.

SUMMARY

Certain aspects of the disclosure and their embodiments may provide solutions to these or other challenges. For example, a spectrum sharing algorithm based on LBT is disclosed. This example LBT algorithm takes the bandwidth of the sensed signal into account when determining whether to declare the channel as being idle or busy. Specifically, the sensing device effectively takes into account how much interference it will generate towards the sensed system when selecting the threshold used for determining whether the channel should be declared as idle or busy. Essentially, the threshold used for declaring the channel to by busy can be increased if the interference generated to the sensed device can be decreased correspondingly.

According to a first aspect of this disclosure, there is provided a method of transmitting a first signal in a first frequency range. The method comprises detecting a second signal in a second frequency range within the first frequency range, wherein the second frequency range is smaller than the first frequency range, and determining a first threshold based on a bandwidth of the second signal. If a signal power of signals within the first frequency range is below or equal to the first threshold, transmitting the first signal within the first frequency range.

According to another aspect of this disclosure, there is provided apparatus for transmitting a first signal in a first frequency range. The apparatus comprises a processor and a memory. The memory contains instructions executable by the processor such that the apparatus is operable to detect a second signal in a second frequency range within the first frequency range, wherein the second frequency range is smaller than the first frequency range, determine a first threshold based on a bandwidth of the second signal, and if a signal power of signals within the first frequency range is below or equal to the first threshold, transmit the first signal within the first frequency range.

BRIEF DESCRIPTION OF THE FIGURES

For a better understanding of examples of the present disclosure, and to show more clearly how the examples may be carried into effect, reference will now be made, by way of example only, to the following drawings in which:

FIG. 1 is a flow chart of a method according to some embodiments;

FIG. 2 shows an example of a deployment with overlapping Wi-Fi and Bluetooth systems;

DETAILED DESCRIPTION OF EXAMPLE EMBODIMENTS

Figure 3:
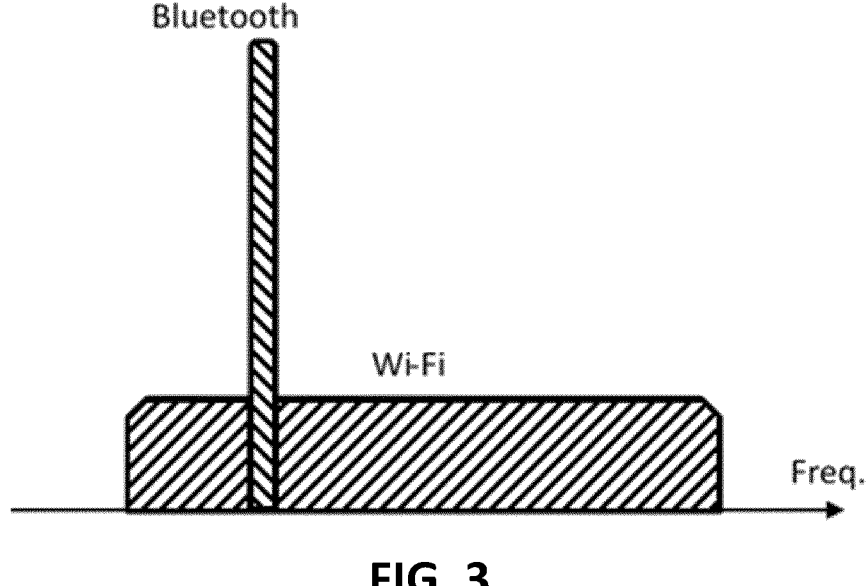
FIG. 3 shows an example channel bandwidths for Wi-Fi and Bluetooth systems.

Certain embodiments may provide one or more of the following technical advantage(s). For example, embodiments of this disclosure may allow for improved coexistence between a first system (e.g. one using LBT) and a second system using narrowband communications, such as for example one using FH, e.g. Bluetooth. The technical advantage of the following embodiments applies also if the second system uses narrowband communication and medium utilization (MU). The improved coexistence may allow for better spectrum utilization and ultimately to better user experience. Another advantage may be that a system based on FH can be made to work with another system based on LBT, without the need to implement LBT in addition to FH.

Some of the embodiments contemplated herein will now be described more fully with reference to the accompanying drawings. Embodiments are provided by way of example to convey the scope of the subject matter to those skilled in the art.

FIG. 1 depicts a method in accordance with particular embodiments. The method 100 may be performed by a network node (e.g. the network node QQ110 or network node QQ300 as described later with reference to FIGS. 7 and 9 respectively). The method begins at step 102 with detecting a second signal in a second frequency range within the first frequency range, wherein the second frequency range is smaller than the first frequency range. Next, step 104 comprises determining a first threshold based at least in part on a bandwidth of the second signal. Then, step 106 comprises, if a signal power of signals within the first frequency range is below or equal to the first threshold (e.g. less than or equal to, or just less than), transmitting the first signal within the first frequency range. In some examples, the first threshold may be determined based additionally on one or more other factors.

In some examples, the method may also comprise sensing the signal power of signals within the first frequency range before transmitting the first signal. This may performed in some examples as part of a Listen Before Talk (LBT) procedure.

Particular example embodiments will now be described for two specific systems, using LBT and FH, respectively, with representative parameters. The system using LBT is Wi-Fi, i.e., based on the IEEE 802.11 standard, whereas the system using FH is Bluetooth. However, this disclosure is not limited to these two standards, but is applicable to any two different standards where one standard typically transmits a signal with a wider bandwidth than the other standard. For example, the first and second signals referred to above with respect to FIG. 1 may be transmitted using these different standards. In some examples, one wideband standard (e.g. associated with the first signal) may use LBT for channel access, and the other standard (e.g. associated with the second signal) may use a channel bandwidth which is smaller than the smallest bandwidth used for LBT by the wideband system. It is not necessary that the narrowband system, e.g. the second signal, uses frequency hopping, though in the following examples it will be assumed that frequency hopping is used.

To describe an example of the problem, suppose that a Wi-Fi system and a Bluetooth system have spatially overlapping coverage areas, as illustrated in FIG. 2. Furthermore, suppose in this example that the bandwidth of the Wi-Fi system is 80 MHz so that this roughly corresponds to the total bandwidth of 79 MHz used by Bluetooth. The instantaneous bandwidth of a Bluetooth signal is 1 MHz and Bluetooth uses FH over the entire 79 MHz. An illustration of this, for Bluetooth using a specific channel, is shown in FIG. 3. However, in other embodiments, other values for bandwidths may be applicable.

To illustrate the problem as well as example embodiments, the following numerical values will be used as examples, but these values are not limiting and other values may be possible.

1. Wi-Fi uses LBT for channel access. This is based on sensing the received power over the entire 80 MHz and declaring the channel as busy if the received power exceeds −66 dBm. If the received power is less than or equal to −66 dBm, the channel is declared as idle.

Figure 4:
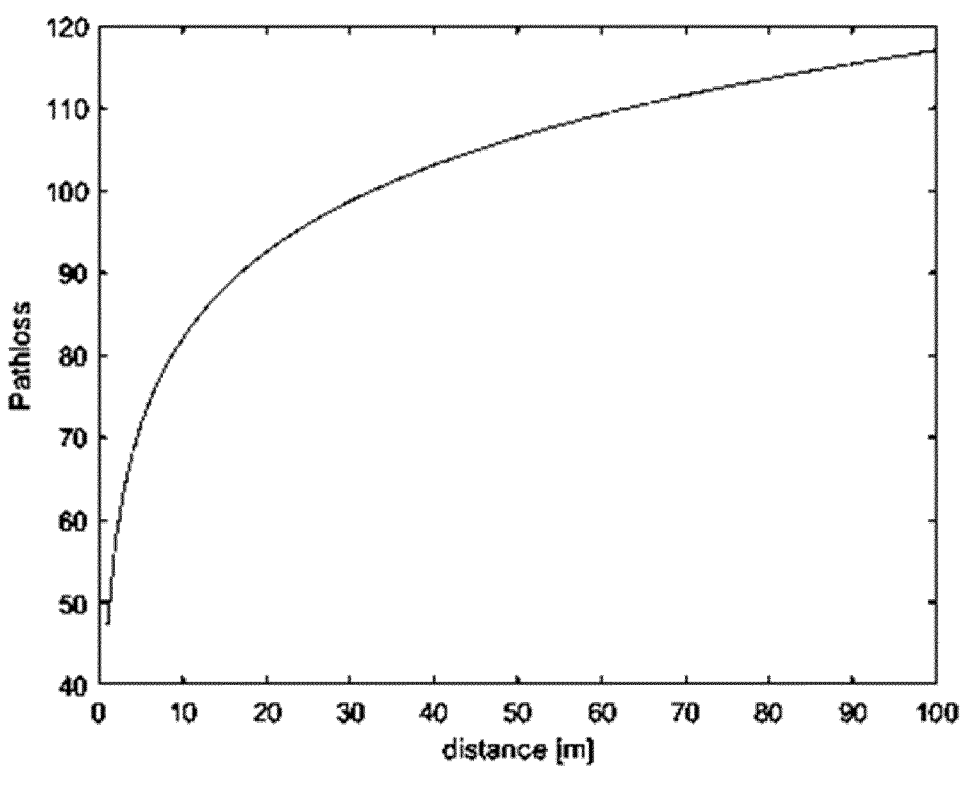
FIG. 4 shows an example of path loss, in dB, as a function of distance.

2. The pathloss as a function of the distance is modeled as PL(d)=47+35*log(d) [dB], where the distance, d, is in meters. This is not important but allows for a qualitative estimation of the severity of the problem. An illustration of the pathloss as a function of the distance is depicted in FIG. 4.

3. Wi-Fi uses a transmission power of 20 dBm and Bluetooth uses a transmission power of 10 dBm. Again, this is not important but allows for a qualitative estimation of the severity of the problem.

With the above assumptions, it follows that Wi-Fi will defer for the Bluetooth signal if this is received at a power of at least or over −66 dBm, corresponding to that the pathloss is at most 76 dB, equivalent to that the distance between the transmitters of the Wi-Fi and Bluetooth signals (or at least between the Bluetooth transmitter and the device measuring the received power) is around 6.75 m. That is, if the Bluetooth transmitter is closer than around 6.75 m and transmitting continuously, a Wi-Fi device will never find the channel idle. (In practice this is not the case since a Bluetooth transmitter will be turned off for more than 200 ms while changing frequency, but for simplicity this transmission gap is ignored here.) At the same time, it can be noted that Wi-Fi will defer for another Wi-Fi transmission if the corresponding pathloss is at most 86 dB, equivalent to a distance of around 13 m. Thus, one may first think that Wi-Fi is a worse source of interference than Bluetooth, since the distance is larger for Wi-Fi. However, the critical difference is that since all Wi-Fi devices are using LBT, they will share the channel in a fair way. Bluetooth, on the other hand, is not using LBT but FH and will therefore never defer. In this case, since the bandwidth used by Wi-Fi covers the entire bandwidth used by Bluetooth, the Wi-Fi transmitter may be completely blocked from using the channel.

Next, consider what would happen if Wi-Fi would transmit although the received power is −66 dBm. The interference caused by this Wi-Fi transmission at the Bluetooth device would then be 20 dBm-76 dB-19 dB=−75 dBm, where the term −19 dB comes from that only ⅛₀th of the Wi-Fi power (distributed across the 80 MHz bandwidth) will be within the 1 MHz Bluetooth channel. Thus, although Wi-Fi is transmitting with 10 dB higher power than Bluetooth, it actually causes 9 dB less interference to the Bluetooth receiver than vice versa. This is simply due to the vastly different bandwidth used by the systems and also shows that LBT does not work as originally intended in this scenario.

The basic idea with LBT is that the received power should be a good indication for how badly an initiated transmission would interfere with an already ongoing transmission. Since the channel can be assumed to be reciprocal, this will be the case assuming similar transmission powers and equal bandwidth. However, as illustrated above, when the bandwidths of the sensed signal (e.g. the second frequency range used by the second signal as referred to above with reference to FIG. 1) and the bandwidth used for sensing (e.g. the first frequency range) are vastly different, this balanced situation does not occur. Examples to counteract the problems described herein are illustrated in the following example embodiments.

Embodiment 1: According to this example embodiment, the threshold used for LBT (which herein is an example of the threshold used to determine whether to transmit the first signal according to step 106 above) also takes into account the bandwidth of the interfering signal (e.g. the second signal), such that the threshold for when the channel can be classified as idle in increased when the bandwidth of the sensed signal is reduced.

In some examples, the threshold is a function of a ratio of the bandwidth of the second signal to a bandwidth of the first frequency range (e.g. the bandwidth of the Wi-Fi channel that will be used to transmit the first signal). For example, the first threshold is proportional to the ratio of the bandwidth of the second signal to the bandwidth of the first frequency range. As a particular example, the threshold can be calculated as (BW in dB relative 1 MHZ):

$$\text{Threshold} = -85 \text{ dBm/MHz} + \text{BW\_sens} + (\text{BW\_sens} - \text{BW\_signal}),$$

where
   BW_sens is the BW over which the sensing is performed, i.e., the BW intended to be used for transmission in case the channel is found to be idle. This may be for example the bandwidth of the first frequency range; and
   BW_signal is the BW of the detected signal, e.g. the bandwidth of the second signal.

It can be noted that the first two terms are currently used in Wi-Fi, corresponding to an energy detect (ED) threshold of −72 dBm/20 MHz or −66 dBm/80 MHz. The last two terms correspond to the ratio between the sensing BW, i.e., the BW of the wideband system (e.g. the first frequency range), and the BW of the narrowband system (e.g. the second frequency range, at that time instant for a frequency hopping system). This ratio will thus allow for an increased threshold if the detected signal only occupies a fraction of the bandwidth used by the wideband system.

The bandwidth (BW) of a signal may be defined herein in various ways. It may for instance be defined as the 99% BW or the 99.9% BW, meaning the BW in which 99% or 99.9% of the total energy is contained, respectively. Alternatively, the BW may be defined as the 20 dB BW, referring to the BW of the signal where the power spectral density (PSD) falls 20 dB below the maximum value. These are merely examples of how a bandwidth may be defined, and other definitions may also be used where appropriate.

If for instance the formula above would be applied to the example, the threshold would be increased by 19 dB, i.e. it would be increased from −66 dBm to −47 dBm. This means that the pathloss would only have to be 57 dB instead of 76 dB, and the corresponding distance where Bluetooth transmission would potentially block Wi-Fi would be reduced from 6.75 m to 1.8 m. In e.g. public locations where a Wi-Fi access point (AP) typically is placed several meters above the floor, the risk of having a Bluetooth device closer than 1.8 m would then essentially be zero. As a result, the access to a Wi-Fi channel for a Wi-Fi device or the access point would be increased.

It is here assumed that the only signal that is detected when performing the sensing is the narrowband signal. In practice, there may be more than one narrowband signal or there may be a wideband signal in addition to the narrowband signal. These two situations, respectively, are discussed in following example embodiments.

Finally, it can be noted that the threshold may depend on the maximum used transmit (TX) power, Pmax. Specifically, if the maximum allowed TX power e.g. would be 24 dBm, the threshold may be increased proportionally in case a lower TX power is used, i.e., $$\text{Threshold} =$$
$$-85 \;\; \text{dBm/MHz} + \text{BW\_sens} + (\text{BW\_sens} - \text{BW\_signal}) + (24 - Pmax),$$

where Pmax is in dBm.

In any embodiments of this disclosure, the method or system may refrain from transmitting the first signal if the signal power of signals within the first frequency range is above the first threshold (as e.g. the method may thus determine that the channel is not idle).

Embodiment 2: This example embodiment is a generalization of embodiment 1, and may be used for the case when two or more narrowband signals are detected. In this case, all narrowband interferers are identified, and their respective BWs are determined. The parameter BW_signal is then simply calculated as the sum of the individual BWs, whereafter the threshold can be determined in the same manner as identified above, e.g. using the same formula as in Embodiment 1.

As an example, suppose that two narrowband signals are detected, one 1 MHz wide and another one 3 MHz wide. The bandwidth of the second signal (e.g. BW_signal), which in this example is multiple signals, is then found to be 1 MHz+3 MHZ=4 MHz. Compared to the case that only a 1 MHz signal was detected, the threshold will be selected 4 times, or 6 dB, lower.

Alternatively, in another example generalization, the narrowband interferers are identified and the BW of the widest interferer is used (e.g. as the bandwidth of the second signal referred to above). If this approach is used, in the above example, the bandwidth of the second signal (BW_signal) would be 3 MHz and the threshold will be selected 3 times, or 4.8 dB, lower.

Embodiment 3: Typically, when determining the power in the first frequency range (e.g. the bandwidth BW_sens), there may be some received power in addition to the second (e.g. narrowband) signal. If this is not properly taken into account, the value for threshold may be too low and thus the spectrum sharing with e.g. other wideband devices will not work as intended. To properly determine the threshold value the following example approach is therefore disclosed.

The second signal (e.g. narrowband interferer) and its bandwidth are determined.

The received power not falling in the bandwidth of the narrowband interferer is determined. This may e.g. be done by measuring the total power in the first frequency range (e.g. BW_sens) and subtracting the power of the second signal (e.g. in the second frequency range or BW_signal part where the narrowband interferer is identified, where BW_signal as before is the bandwidth of the narrowband interferer).

LBT is performed with respect to other potential wideband signals, using the received power after the power from the narrowband interferer is subtracted and comparing this with the standard threshold, e.g.:

$$\text{Threshold} = -85 \;\; \text{dBM/MHz} + \text{BW\_sens}[\text{in dB relative 1 MHz}]$$

If it is found that the channel is busy, the device performing LBT has to defer from channel access according to the ordinary rules. If, however, the channel is found to be idle the LBT procedure continues as follows:

A new threshold is calculated as described in Embodiment 1, i.e., based only on the received power within the bandwidth of the second signal, and the first signal may or may not be transmitted based on the new threshold. For example, LBT may be performed using this threshold.

Effectively, since the second threshold will be lower than the first one, the wideband transmitter will not be adversely impacted by a strong narrowband interferer as would have been the case if the total received power would have been compared to the first threshold. However, due to the LBT performed with the first threshold, it is ensured that a device implementing the improved LBT procedure will still defer properly with respect to e.g. other wideband devices not implementing the improved LBT.

Thus, for example, embodiments of this disclosure (e.g. the method shown in FIG. 1 above) may comprise determining a signal power of signals within the first frequency range and outside of the second frequency range, wherein transmitting the first signal within the first frequency range is performed also if the signal power of signals within the first frequency range and outside of the second frequency range is below or equal to a further threshold lower than the first threshold. In some examples, the method may also comprise refraining from transmitting the first signal if the signal power of signals within the first frequency range and outside of the second frequency range is above the further threshold. Additionally or alternatively, determining the signal power of signals within the first frequency range and outside of the second frequency range may comprise sensing the signal power of signals within the first frequency range, and subtracting the signal power of the second signal within the second frequency range. Sensing the signal power of signals within the first frequency range may be performed for example as part of a Listen Before Talk (LBT) procedure.

In an alternative to determine the threshold, it is assumed that that wideband signal contributes with interference over the full sensing bandwidth, and therefore rather than subtracting the (complete) power that is within bandwidth of the narrowband interferer, this is taken into account by selecting the threshold as:

$$\text{Threshold} =$$
$$-85 \;\; \text{dBM/MHz} + \text{BW\_sens} - \text{BW\_signal}[\text{in dB relative 1 MHz}]$$

Embodiment 4: In an example alternative approach to circumvent that the threshold is selected to be too high, a scaling factor is introduced so that, effectively, the difference in the bandwidths of the first and second frequency ranges is scaled with a factor, k, where $0 < k <= 1$. For example:

$$\text{Threshold} = -85 \;\; \text{dBm/MHz} + \text{BW\_sens} - k * (\text{BW\_sens} - \text{BW\_signal})$$

In some examples of this, the first threshold may still be proportional to the ratio of the bandwidth of the second signal to the bandwidth of the first frequency range.

Figures 5, 6:
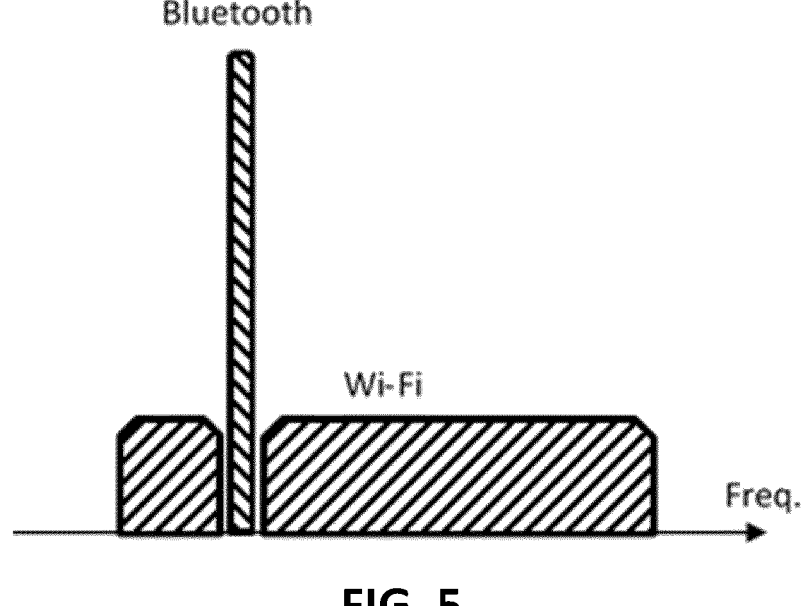
FIG. 5 shows an example of puncturing a Wi-Fi signal to reduce interference caused to a Bluetooth system.
FIG. 6 shows an example of apparatus for transmitting a first signal in a first frequency range.

Embodiment 5: Once a second (e.g. narrowband) signal has been detected within the first frequency range (e.g. sensing bandwidth), coexistence may be improved even further in some examples by deliberately puncturing the first signal. That is, for example, transmitting the first signal within the first frequency range may comprises attenuating or preventing transmission at least within the second frequency range. An example of this is illustrated in FIG. 5, where it is shown that the first signal, a Wi-Fi signal in this example, is not transmitted in the second frequency range containing the second signal (a Bluetooth signal in this example), and is transmitted at frequencies above and below the Bluetooth signal (though in some examples, where the Bluetooth signal is at the high or low end of the first frequency range, the first signal or Wi-Fi signal may be transmitted only above or below the frequency of the second signal or Bluetooth signal). There may also be guard bands on one or both sides of the second signal in some examples. It should be noted that puncturing may be simple for a wideband system using orthogonal frequency division multiplexing (OFDM), since one can simply attenuate, null, mute or refrain from transmitting the sub-carrier(s) at frequencies where it is desired to puncture the signal.

To give a specific example, suppose that the first signal to be transmitted is based on IEEE 802.11ax so that the sub-carrier spacing is 78.125 kHz. By nulling 15 sub-carriers, the null would be 15*78.125 kHz~=1.2 MHz wide, which would be suitable to protect a 1 MHz wide Bluetooth channel in some examples.

Because the system in this way may be able to reduce the interference caused to the second signal/narrowband system even further, the threshold for where the channel has to be declared as busy can be increased even further. Thus, for example, the threshold may be increased based on the capability to perform attenuating or preventing transmission of the first signal within the second frequency range. In some examples, this may be combined with the approach described in Embodiment 3 to ensure that the device is properly deferring for wireless interferers as well.

Embodiment 6: In an alternative embodiment, which is applicable when the wideband system supports orthogonal frequency division multiple access (OFDMA), the null or puncturing may be created by nulling or muting one or more resources units (RU)s, that otherwise would have been used to transmit data to some users. This may mean a simpler way to implement nulling since the signal sent to the other users are not impacted at all by the puncturing. However, this may in some examples come at the expense of a slightly worse granularity as compared to the above embodiment.

Embodiment 7: If the system has detected narrowband signals within the sensing bandwidth for a certain period of time or systemically, it may perform link adaptation in a particular way. It may use a more robust modulation and coding scheme than would be used had the narrowband interference not been detected in combination with interleaved PRB allocation. The interleaving distance can be chosen to be larger than the narrowband signal. This can mitigate the risk that an ongoing transmission such as a wideband or Wi-Fi signal is completely lost when experiencing interference from a narrowband signal.

Thus, for example, the method 100 above may comprise selecting a modulation and coding scheme (MCS) for transmission of the first signal based on the bandwidth of the second signal. Additionally or alternatively, the method 100 may comprise selecting a frequency interleaving distance for physical resource blocks (PRBs) used for transmission of the first signal, wherein the frequency interleaving distance is equal to or greater than the bandwidth of the second signal. Thus, for example, adjacent PRBs (before interleaving) will not both be affected by the second signal after interleaving and transmission.

Any number of individual features from any one or more of the above embodiments may be combined with any number of individual features of any one or more other embodiments.

FIG. 6 is a schematic of an example of apparatus 600 for transmitting a first signal in a first frequency range. The apparatus 600 comprises processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable to detect a second signal in a second frequency range within the first frequency range, wherein the second frequency range is smaller than the first frequency range, determine a first threshold based on a bandwidth of the second signal, and if a signal power of signals within the first frequency range is below or equal to the first threshold (or e.g. just below the first threshold), transmit the first signal within the first frequency range. In some examples, the apparatus 600 is operable to carry out the method 200 described above with reference to FIG. 1. The first signal may be for example a wideband or Wi-Fi signal. Additionally or alternatively, the second signal may be for example a narrowband, frequency hopping or Bluetooth signal.

In some examples, the memory 604 contains instructions executable by the processing circuitry 602 such that the apparatus 600 is operable to detect at least one further signal within the first frequency range, each of the at least one further signal having a respective frequency range that is smaller than the first frequency range. The memory 604 may also contain instructions executable by the processing circuitry 602 such that the apparatus 600 is operable to determine a first threshold based on a bandwidth of the second signal by determining the first threshold based on a sum or maximum of the bandwidths of the second signal and the at least one further signal.

In some examples, the memory 604 contains instructions executable by the processing circuitry 602 such that the apparatus 600 is operable to determine a signal power of signals within the first frequency range and outside of the second frequency range. The memory 604 may also contain instructions executable by the processing circuitry 602 such that the apparatus 600 is operable to transmit the first signal within the first frequency range also if the signal power of signals within the first frequency range and outside of the second frequency range is below or equal to a further threshold lower than the first threshold. In some examples, the memory 604 contains instructions executable by the processing circuitry 602 such that the apparatus 600 is operable to refrain from transmitting the first signal if the signal power of signals within the first frequency range and outside of the second frequency range is above the further threshold. Additionally or alternatively, the memory 604 contains instructions executable by the processing circuitry 602 such that the apparatus 600 is operable to determine the signal power of signals within the first frequency range and outside of the second frequency range by sensing the signal power of signals within the first frequency range, and subtracting the signal power of the second signal within the second frequency range In some examples, the memory 604 contains instructions executable by the processing circuitry 602 such that the apparatus 600 is operable to refrain from transmitting the first signal if the signal power of signals within the first frequency range is above the first threshold. Additionally or alternatively, in some examples, the memory 604 contains instructions executable by the processing circuitry 602 such that the apparatus 600 is operable to transmit the first signal within the first frequency range by attenuating or preventing transmission within the second frequency range. Attenuating or preventing transmission within the second frequency range may for example comprise attenuating one or more subcarriers within the second frequency range, refraining from transmitting on subcarriers within the second frequency range, attenuating one or more Resource Units (RUs) that at least partially overlap with the second frequency range, or refraining from transmitting using one or more Resource Units (RUs) that at least partially overlap with the second frequency range.

In some examples, the memory 604 contains instructions executable by the processing circuitry 602 such that the apparatus 600 is operable to determine the first threshold based further on a capability to perform attenuating or preventing transmission within the second frequency range. In some examples, the first threshold may be increased based on the capability (e.g. of the apparatus 600) to perform attenuating or preventing transmission within the second frequency range.

The memory 604 may in some examples contain instructions executable by the processing circuitry 602 such that the apparatus 600 is operable to sense the signal power of signals within the first frequency range before transmitting the first signal. This may be performed for example as part of a Listen Before Talk (LBT) procedure.

The memory 604 may in some examples contain instructions executable by the processing circuitry 602 such that the apparatus 600 is operable to determine or estimate the bandwidth of the second signal.

Figure 7:
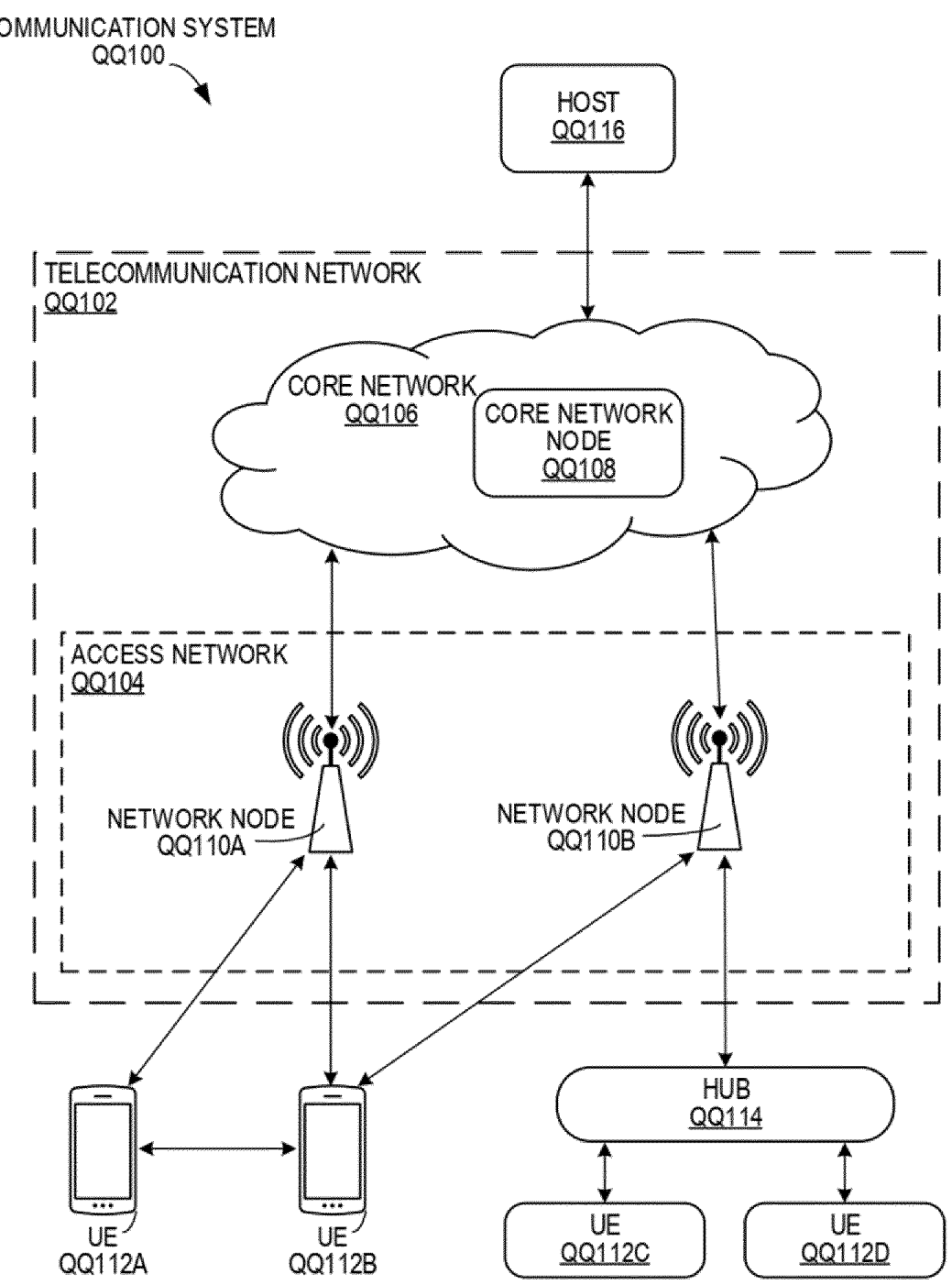
FIG. 7 shows an example of a communication system in accordance with some embodiments.

FIG. 7 shows an example of a communication system QQ100 in accordance with some embodiments.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110a and QQ110b (one or more of which may be generally referred to as network nodes QQ110), or any other similar 3$^{rd}$ Generation Partnership Project (3GPP) access node or non-3GPP access point. The network nodes QQ110 facilitate direct or indirect connection of user equipment (UE), such as by connecting UEs QQ112a, QQ112b, QQ112c, and QQ112d (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102, and may be operated by the service provider or on behalf of the service provider. The host QQ116 may host a variety of applications to provide one or more services. Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio—Dual Connectivity (EN-DC).

In the example illustrated in FIG. 7, the hub QQ114 communicates with the access network QQ104 to facilitate indirect communication between one or more UEs (e.g., UE QQ112*c* and/or QQ112*d*) and network nodes (e.g., network node QQ110*b*). In some examples, the hub QQ114 may be a controller, router, a content source and analytics node, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110*b*. The hub QQ114 may also allow for a different communication scheme and/or schedule between the hub QQ114 and UEs (e.g., UE QQ112*c* and/or QQ112*d*), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110*b*. In other embodiments, the hub QQ114 may be a non-dedicated hub—that is, a device which is capable of operating to route communications between the UEs and network node QQ110*b*, but which is additionally capable of operating as a communication start and/or end point for certain data channels.

Figure 8:
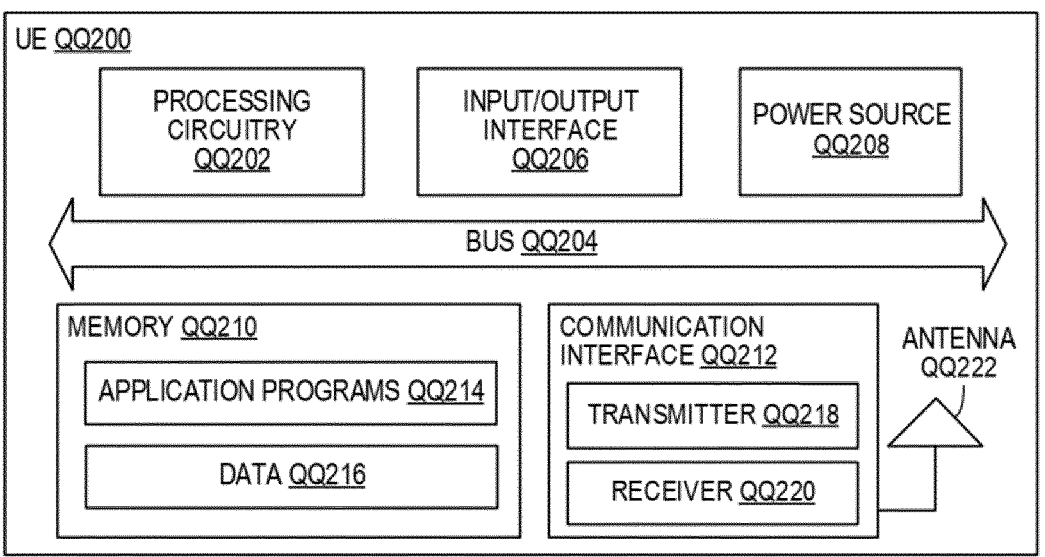
FIG. 8 shows a User Equipment (UE) in accordance with some embodiments.

FIG. 8 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs). The processing circuitry QQ202 may be operable to provide, either alone or in conjunction with other UE QQ200 components, such as the memory QQ210, to provide UE QQ200 functionality.

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In some embodiments, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE QQ200 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
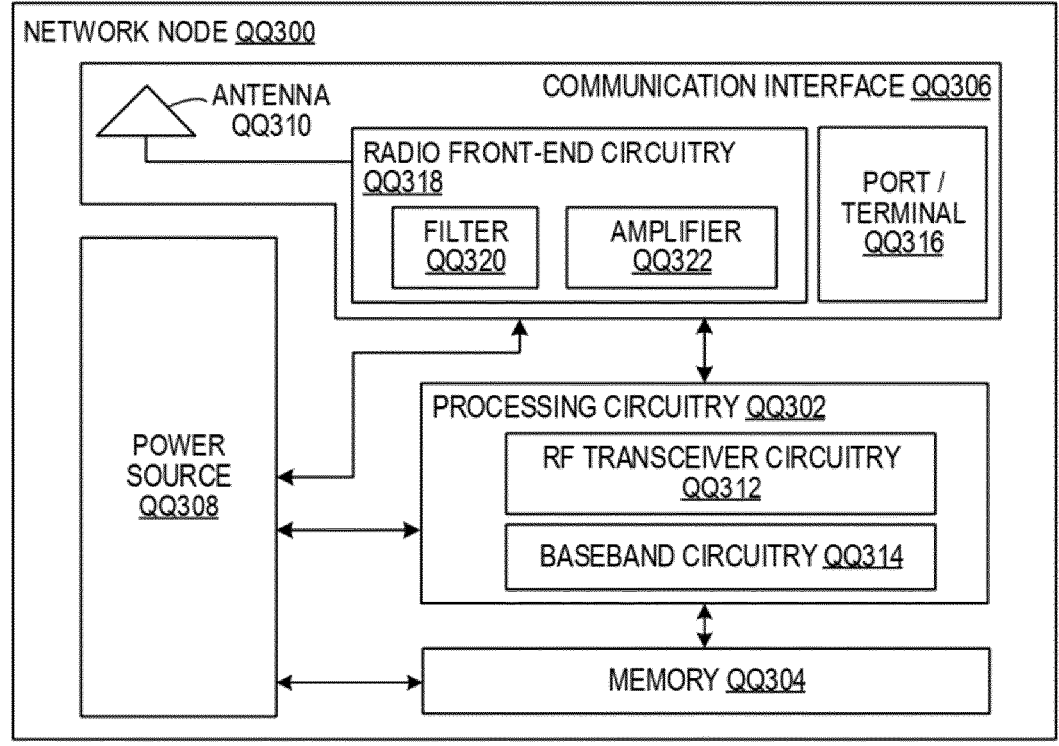
FIG. 9 shows a network node in accordance with some embodiments.

FIG. 9 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs).

Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes processing circuitry QQ302, a memory QQ304, a communication interface QQ306, and a power source QQ308, and/or any other component, or any combination thereof. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality. For example, the processing circuitry QQ302 may be configured to cause the network node to perform the methods as described with reference to FIG. 1.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal (s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 9 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 10:
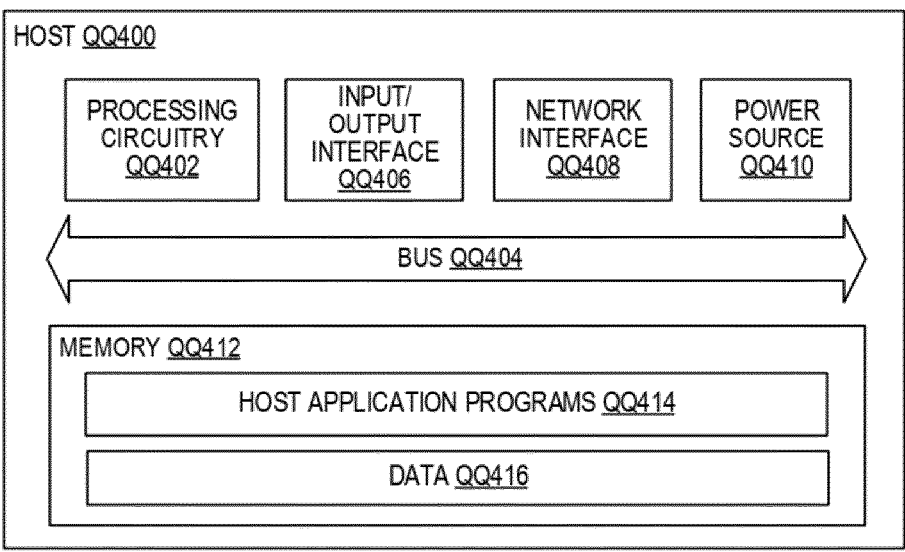
FIG. 10 is a block diagram of a host.

FIG. 10 is a block diagram of a host QQ400, which may be an embodiment of the host QQ116 of FIG. 7, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS.

8 and 9, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
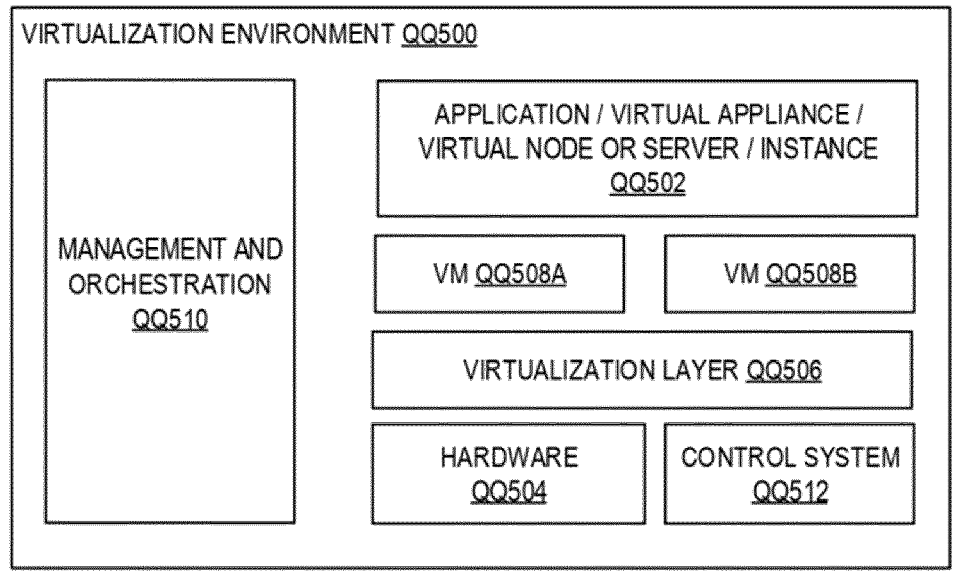
FIG. 11 is a block diagram illustrating a virtualization environment in which functions implemented by some embodiments may be virtualized.

FIG. 11 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g. such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 12:
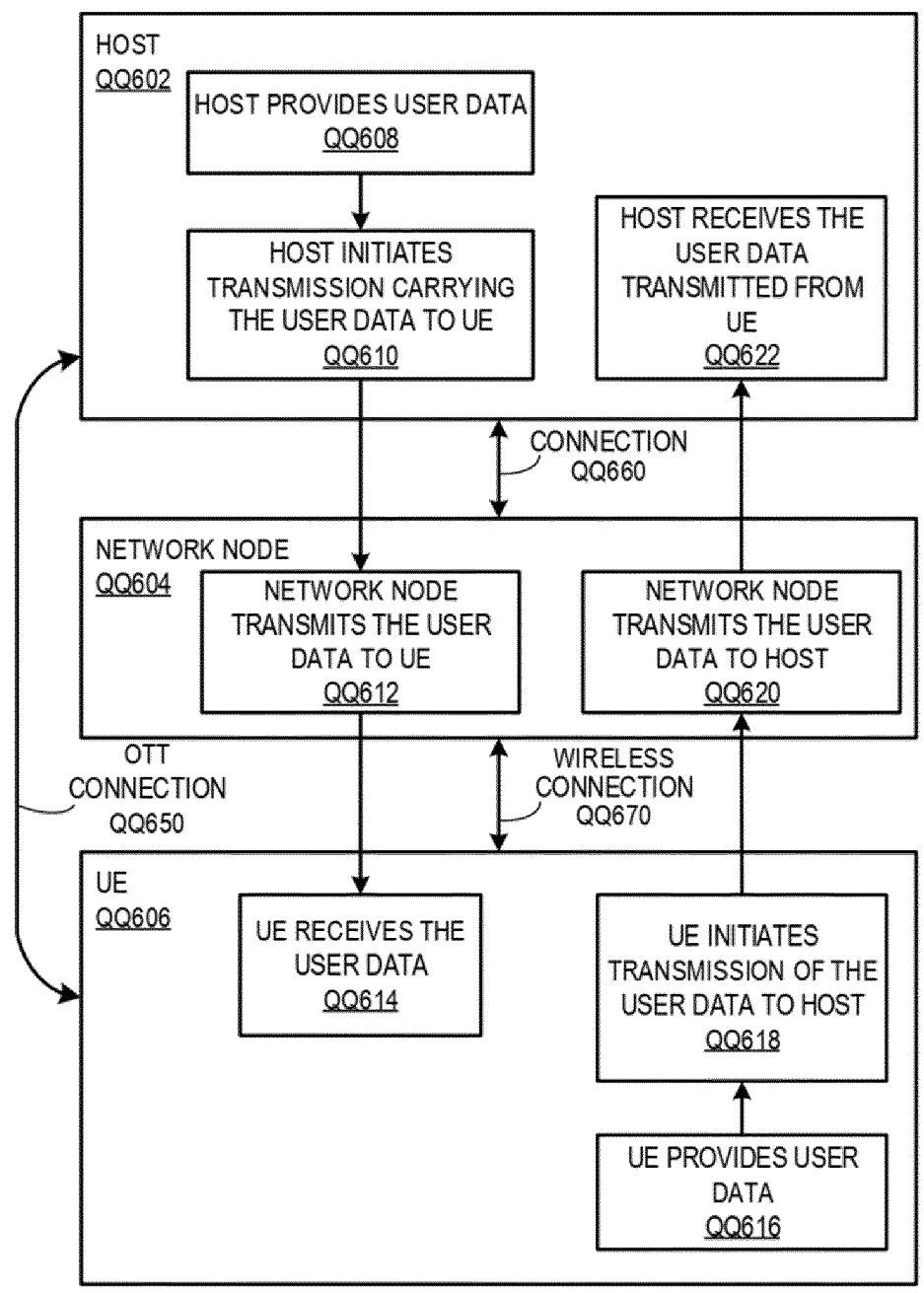
FIG. 12 shows a communication diagram of a host communicating via a network node with a UE over a partially wireless connection in accordance with some embodiments.

FIG. 12 shows a communication diagram of a host QQ602 communicating via a network node QQ604 with a UE QQ606 over a partially wireless connection in accordance with some embodiments. Example implementations, in accordance with various embodiments, of the UE (such as a UE QQ112a of FIG. 7 and/or UE QQ200 of FIG. 8), network node (such as network node QQ110a of FIG. 7 and/or network node QQ300 of FIG. 9), and host (such as host QQ116 of FIG. 7 and/or host QQ400 of FIG. 10) discussed in the preceding paragraphs will now be described with reference to FIG. 12.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 7) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve the spectral efficiency and thereby provide benefits such as increased data rate, increased reliability of communications, and/or other benefits.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above, or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

Embodiments of this disclosure may include one or more of the following enumerated embodiments:

1. A user equipment for transmitting a first signal in a first frequency range, comprising:

processing circuitry configured to cause the user equipment to perform any of the steps of any embodiment of the method 100; and power supply circuitry configured to supply power to the processing circuitry.

2. A network node for transmitting a first signal in a first frequency range, the network node comprising:

processing circuitry configured to cause the network node to perform any of the steps of any embodiment of the method 100;

power supply circuitry configured to supply power to the processing circuitry.

3. A user equipment (UE) for transmitting a first signal in a first frequency range, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any embodiment of the method 100;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

4. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any embodiment of the method 100 to receive the user data from the host.

5. The host of the previous embodiment, wherein the cellular network further includes a network node configured to communicate with the UE to transmit the user data to the UE from the host.

6. The host of the previous 2 embodiments, wherein:

the processing circuitry of the host is configured to execute a host application, thereby providing the user data; and the host application is configured to interact with a client application executing on the UE, the client application being associated with the host application.

7. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of any embodiment of the method 100 to receive the user data from the host.

8. The method of the previous embodiment, further comprising:

at the host, executing a host application associated with a client application executing on the UE to receive the user data from the UE.

9. The method of the previous embodiment, further comprising:

at the host, transmitting input data to the client application executing on the UE, the input data being provided by executing the host application, wherein the user data is provided by the client application in response to the input data from the host application.

10. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any embodiment of the method 100 to transmit the user data to the host.

11. The host of the previous embodiment, wherein the cellular network further includes a network node configured to communicate with the UE to transmit the user data from the UE to the host.

12. The host of the previous 2 embodiments, wherein:

the processing circuitry of the host is configured to execute a host application, thereby providing the user data; and the host application is configured to interact with a client application executing on the UE, the client application being associated with the host application.

13. A method implemented by a host configured to operate in a communication system that further includes a network node and a user equipment (UE), the method comprising:

at the host, receiving user data transmitted to the host via the network node by the UE, wherein the UE performs any of the steps of any embodiment of the method 100 to transmit the user data to the host.

14. The method of the previous embodiment, further comprising:

at the host, executing a host application associated with a client application executing on the UE to receive the user data from the UE.

15. The method of the previous embodiment, further comprising:

at the host, transmitting input data to the client application executing on the UE, the input data being provided by executing the host application, wherein the user data is provided by the client application in response to the input data from the host application.

16. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any embodiment of the method 100 to transmit the user data from the host to the UE.

17. The host of the previous embodiment, wherein:

the processing circuitry of the host is configured to execute a host application that provides the user data; and the UE comprises processing circuitry configured to execute a client application associated with the host application to receive the transmission of user data from the host.

18. A method implemented in a host configured to operate in a communication system that further includes a network node and a user equipment (UE), the method comprising:

providing user data for the UE; and initiating a transmission carrying the user data to the UE via a cellular network comprising the network node, wherein the network node performs any of the operations of any embodiment of the method 100 to transmit the user data from the host to the UE.

19. The method of the previous embodiment, further comprising, at the network node, transmitting the user data provided by the host for the UE.

20. The method of any of the previous 2 embodiments, wherein the user data is provided at the host by executing a host application that interacts with a client application executing on the UE, the client application being associated with the host application.

21. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any embodiment of the method 100 to transmit the user data from the host to the UE.

22. The communication system of the previous embodiment, further comprising:

the network node; and/or the user equipment.

23. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to perform any of the operations of any embodiment of the method 100 to receive the user data from a user equipment (UE) for the host.

24. The host of the previous 2 embodiments, wherein:

the processing circuitry of the host is configured to execute a host application, thereby providing the user data; and the host application is configured to interact with a client application executing on the UE, the client application being associated with the host application.

25. The host of the any of the previous 2 embodiments, wherein the initiating receipt of the user data comprises requesting the user data.

26. A method implemented by a host configured to operate in a communication system that further includes a network node and a user equipment (UE), the method comprising:

at the host, initiating receipt of user data from the UE, the user data originating from a transmission which the network node has received from the UE, wherein the network node performs any of the steps of any embodiment of the method 100 to receive the user data from the UE for the host.

27. The method of the previous embodiment, further comprising at the network node, transmitting the received user data to the host.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The invention claimed is:

1. A method of transmitting a first signal in a first frequency range having a first channel bandwidth, the method comprising:

detecting a second signal in a second frequency range within the first frequency range, wherein the second frequency range has a second channel bandwidth, and the second channel bandwidth is smaller than the first channel bandwidth;

determining a first threshold for listen before talk (LBT), based on a bandwidth of the second signal; and responsive to a signal power of signals within the first frequency range being below or equal to the first threshold, transmitting the first signal within the first frequency range;

wherein the first threshold is a function of a ratio of the bandwidth of the second signal to the first channel bandwidth of the first frequency range or is proportional to the ratio of the bandwidth of the second signal to the first channel bandwidth of the first frequency range.

2. The method of claim 1, comprising detecting at least one further signal within the first frequency range, each of the at least one further signal having a respective bandwidth that is smaller than the first channel bandwidth, and wherein determining a first threshold for LBT based on a bandwidth of the second signal comprises determining the first threshold based on a sum or maximum of the bandwidth of the second signal and the respective bandwidth of the at least one further signal.

3. The method of claim 1, comprising determining a signal power of signals within the first frequency range and outside of the second frequency range, wherein transmitting the first signal is responsive to the signal power of signals within the first frequency range and outside of the second frequency range being below or equal to a further threshold being lower than the first threshold.

4. The method of claim 3, wherein determining the signal power of signals within the first frequency range and outside of the second frequency range comprises sensing the signal power of signals within the first frequency range, and subtracting the signal power of the second signal.

5. The method of claim 4, wherein sensing the signal power of signals within the first frequency range is performed as part of a LBT procedure.

6. The method of claim 1, comprising:
selecting a modulation and coding scheme (MCS) for transmission of the first signal based on the bandwidth of the second signal; and/or
selecting a frequency interleaving distance for physical resource blocks (PRBs) used for transmission of the first signal, wherein the frequency interleaving distance is equal to or greater than the bandwidth of the second signal.

7. The method of claim 1, comprising refraining from transmitting the first signal if the signal power of signals within the first frequency range is above the first threshold.

8. The method of claim 1, wherein transmitting the first signal within the first frequency range comprises attenuating or preventing transmission within the second frequency range.

9. The method of claim 8, wherein attenuating or preventing transmission within the second frequency range comprises one of the followings:
attenuating one or more subcarriers within the second frequency range;
refraining from transmitting on subcarriers within the second frequency range;
attenuating one or more Resource Units (RUs) that at least partially overlap with the second frequency range;
refraining from transmitting using one or more Resource Units (RUs) that at least partially overlap with the second frequency range.

10. The method of claim 9, wherein the first threshold is determined based further on a capability to perform attenuating or preventing transmission within the second frequency range.

11. The method of claim 10, wherein the first threshold is increased based on the capability to perform attenuating or preventing transmission within the second frequency range.

12. The method of claim 1, comprising sensing the signal power of signals within the first frequency range before transmitting the first signal.

13. The method of claim 12, wherein sensing the signal power of signals within the first frequency range is performed as part of a LBT procedure.

14. The method of claim 1, wherein:
the first signal comprises a Wi-Fi signal; and/or
the second signal comprises a frequency hopping signal or Bluetooth signal.

15. The method of claim 1, comprising determining or estimating the bandwidth of the second signal.

16. The method of claim 1, further comprising:
obtaining user data; and
forwarding the user data to a host or a terminal device.

17. A non-transitory computer-readable medium comprising, stored thereupon, a computer program product comprising instructions which, when executed on at least one processor, cause the at least one processor to carry out a method according to claim 1.

18. Apparatus for transmitting a first signal in a first frequency range having a first channel bandwidth, the apparatus comprising a processor and a memory, the memory containing instructions executable by the processor such that the apparatus is operable to:
detect a second signal in a second frequency range within the first frequency range, wherein the second frequency range has a second channel bandwidth, and the second channel bandwidth is smaller than the first channel bandwidth;
determine a first threshold for listen before talk (LBT), based on a bandwidth of the second signal; and
responsive to a signal power of signals within the first frequency range being below or equal to the first threshold, transmit the first signal within the first frequency range;
wherein the first threshold is a function of a ratio of the bandwidth of the second signal to the first channel bandwidth of the first frequency range or is proportional to the ratio of the bandwidth of the second signal to the first channel bandwidth of the first frequency range.

19. A method of determining whether to transmit a first signal in a first frequency range having a first channel bandwidth, the method comprising:
detecting a second signal in a second frequency range within the first frequency range, wherein the second frequency range has a second channel bandwidth, and the second channel bandwidth is smaller than the first channel bandwidth;
determining a first threshold for listen before talk (LBT), based on a bandwidth of the second signal;
determining a signal power of signals within the first frequency range and outside of the second frequency range; and
determining whether to transmit the first signal within the first frequency range, based on whether the signal power of signals within the first frequency range being below or equal to the first threshold; and
refraining from transmitting the first signal if the signal power of signals within the first frequency range and outside of the second frequency range is above a further threshold, the further threshold being lower than the first threshold;

wherein the first threshold is a function of a ratio of the bandwidth of the second signal to the first channel bandwidth of the first frequency range or is proportional to the ratio of the bandwidth of the second signal to the first channel bandwidth of the first frequency range.

20. The method of claim 19, wherein determining the signal power of signals within the first frequency range and outside of the second frequency range comprises sensing the signal power of signals within the first frequency range, and subtracting the signal power of the second signal.

\* \* \* \* \*